United States Patent [19]
Phillips et al.

[11] Patent Number: 5,433,562
[45] Date of Patent: Jul. 18, 1995

[54] CUTTER QUICK CHANGE SYSTEM

[75] Inventors: James D. Phillips, Posen; William F. Hildreth, Herron, both of Mich.

[73] Assignee: J. D. Phillips Corporation, Alpena, Mich.

[21] Appl. No.: 160,741

[22] Filed: Dec. 3, 1993

[51] Int. Cl.6 .............................. B23C 5/26
[52] U.S. Cl. .................. 409/233; 279/125; 279/131; 408/239 A
[58] Field of Search .......... 409/232, 233, 234; 408/239 R, 239 A, 240; 279/125, 129, 131; 407/34, 40, 53

[56] References Cited

U.S. PATENT DOCUMENTS

| 559,012 | 4/1896 | Warren | 279/141 X |
| 2,361,324 | 10/1944 | Severson | 409/233 |
| 3,691,900 | 9/1972 | Novak et al. | 279/141 X |
| 3,762,271 | 10/1973 | Poincenot | 409/233 |
| 4,325,664 | 4/1982 | Mori | 409/234 |
| 4,478,541 | 10/1984 | Okada et al. | 409/232 |
| 4,583,890 | 4/1986 | Ewing et al. | 409/234 X |
| 4,735,532 | 4/1988 | Hunt | 409/233 |
| 4,906,147 | 3/1990 | Friesinger et al. | 409/232 |
| 4,964,762 | 10/1990 | Arai et al. | 407/34 |

FOREIGN PATENT DOCUMENTS

| 1255088 | 6/1989 | Canada | 29/14 |
| 0185842 | 8/1985 | European Pat. Off. | |
| 1752833 | 7/1968 | Germany | |
| 1777019 | 8/1968 | Germany | |
| 3045536 | 12/1980 | Germany | |
| 3211844 | 10/1983 | Germany | 279/131 |
| 2205405 | 8/1990 | Japan | 279/131 |
| 0151685 | 9/1955 | Sweden | |
| 504930 | 2/1970 | Switzerland | |
| 1272080 | 8/1969 | United Kingdom | |
| 1303394 | 6/1971 | United Kingdom | |
| 1510589 | 6/1976 | United Kingdom | |
| 2076711 | 6/1981 | United Kingdom | |

Primary Examiner—Z. R. Bilinsky
Attorney, Agent, or Firm—Barnes, Kisselle, Raisch, Choate, Whittemore & Hulbert

[57] ABSTRACT

The tool spindle has a drive plate on which a cutter is mounted. Drive keys on the drive plate engage slots in the cutter so that the cutter rotates with the drive plate. A clamp bar is provided to clamp the cutter against the drive plate. The cutter is formed with clearances which register with the clamp bar when the cutter is rotated relative to the clamp bar, so that the cutter may be removed from the drive plate. A new cutter is then reverse rotated into a position in which it may be clamped by the clamp bar. A spring holds the clamp bar in its clamping position. The quick change system also includes two or more locking fingers which are activated by centrifugal force to maintain the cutter clamped to the drive plate even in the event of failure of the spring which normally holds the clamp bar in its clamping position.

11 Claims, 2 Drawing Sheets

CUTTER QUICK CHANGE SYSTEM

This invention relates generally to tool change systems and refers more particularly to a system enabling the rapid change of a milling cutter.

BACKGROUND AND SUMMARY

In accordance with conventional practice, the operator must loosen and remove at least one and as many as six mounting screws to remove a cutter head from a spindle. He then must place the new cutter head in place and reinstall all of the mounting screws and torque them in place. This requires considerable time, up to 30 minutes, and involves the risk of dropping one of the screws in the coolant pit which would involve even more time. In another currently available system, the cutter is attached to an adapter which makes a much heavier unit that usually requires two hands and may take up to five minutes to change.

In accordance with the tool change system of the present invention, the cutter is held on the spindle by a clamp. When the clamp is released, the operator need only grasp the cutter with one hand and rotate it to a position in which it may be pulled off the spindle. The operator may then slide a new cutter on the spindle and reverse rotate it and re-clamp the new cutter. This entire procedure requires only a few seconds to perform.

More specifically, the spindle has a drive plate on which the cutter is mounted. Drive keys on the drive plate engage slots in the cutter so that the cutter rotates with the drive plate. A clamp bar is provided to clamp the cutter against the drive plate. The cutter is formed with clearances which register with the clamp bar when the cutter is rotated relative to the clamp bar, so that the cutter may be removed from the drive plate. A new cutter is then reverse rotated into a position in which it may be clamped by the clamp bar. A spring holds the clamp bar in its clamping position.

The quick change system also includes a pair of locking fingers which are activated by centrifugal force to maintain the cutter clamped to the drive plate even in the event of failure of the spring which normally holds the clamp bar in its clamping position.

One object of this invention is to provide a cutter quick-change system having the foregoing features.

Another object is to provide a cutter quick-change system which is composed of a relatively few simple parts, is rugged and durable in operation, is fast acting, and is capable of being inexpensively manufactured and assembled.

These and other objects, features and advantages of the invention will become more apparent as the following description proceeds, especially when considered with the accompanying drawings.

DETAILED DESCRIPTION

Figure 1:
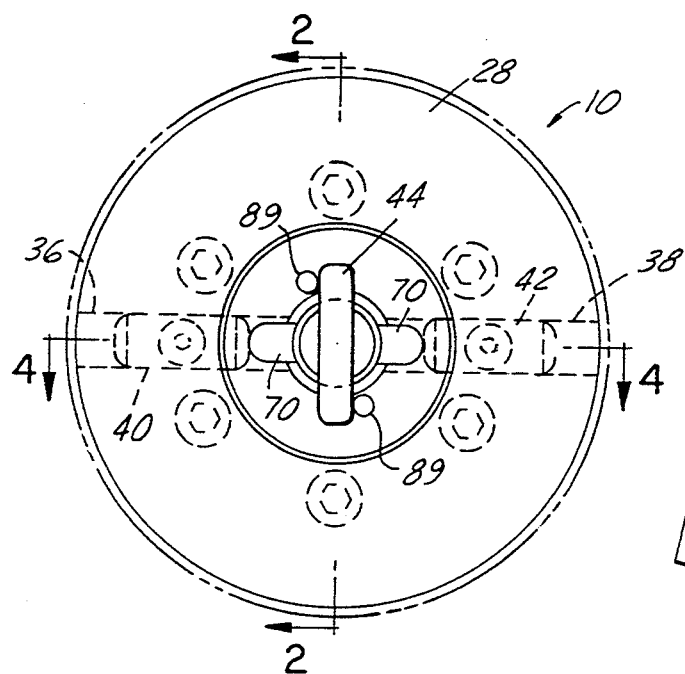
FIG. 1 is an end view showing a cutter clamped to the drive plate on the end of a spindle, in accordance with the invention.
Figure 4:
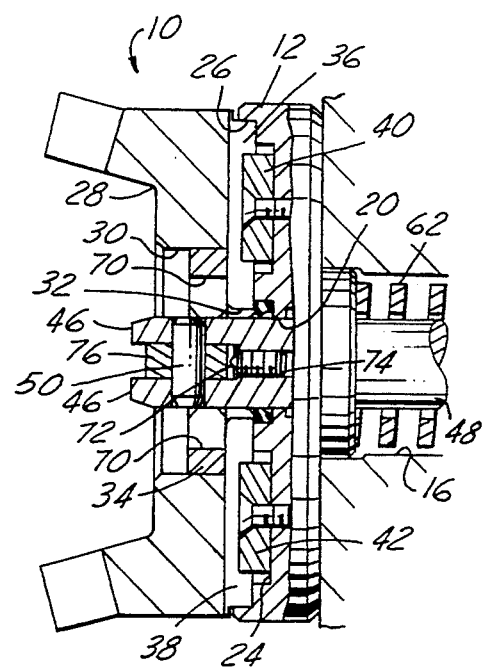
FIG. 4 is a fragmentary sectional view taken on the line 4—4 in FIG. 1.
Figure 5:
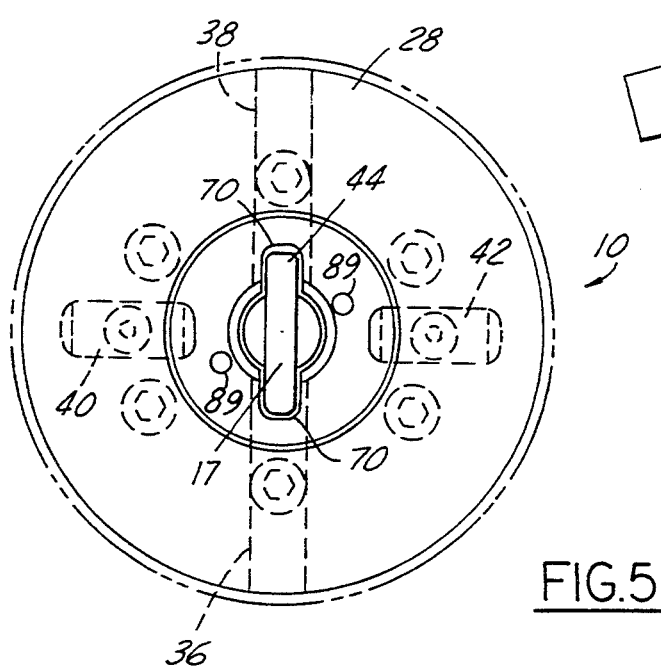
FIG. 5 is an end view similar to FIG. 1 but showing the cutter rotated 90° from the FIG. 1 position.

Referring now more particularly to the drawings, a milling cutter 10 is shown releasably mounted on the drive plate 12 of a tool spindle 14.

The spindle 14 has a cylindrical central bore 16 concentric with its axis of rotation 17. The drive plate 12 is mounted on the end of the spindle 14 by bolts 18 and has a central opening 20 registering with bore 16. The outer face of the drive plate has a circular recess 22 which is perpendicular to the axis of rotation 17 of the spindle and provides a seat for the cutter body 28. Recess 22 is bounded by a circular wall 26 concentric with the axis of rotation.

The cutter body has a central cup-shaped recess 30 in its front face with a hole 32 through the bottom of the recess which registers with the axis of rotation 17 when mounted on the drive plate. A wear ring 34 is seated in the bottom of recess 30 with a press fit. Aligned radially extending slots 36 and 38 are formed in the inner surface of the cutter.

Keys 40 and 42 are affixed in depressions 24 in recess 22 in the drive plate on opposite sides of the center opening 20 thereof and are adapted to engage in slots 36 and 38 to cause the cutter to rotate with the drive plate.

A clamp bar 44 clamps the cutter 10 to the seat 22 of the drive plate. The clamp bar 44 is flat and generally T-shaped and is pivotally mounted in the slot between two laterally spaced projections 46 on the outer end of a clamp rod 48. More specifically, the clamp bar 44 pivots on a pin 50 extending between projections 46. The pin extends through the stem 52 of the clamp bar and the ends of the cross member 54 of the clamp bar overlie the wear ring 34.

The clamp rod 48 extends lengthwise within the bore in the spindle and is guided for reciprocation in the bore by a guide bushing 56. The guide bushing is bolted to a lock ring 58 secured to the inner end of clamp rod 48 and is also secured to a tubular lock housing 60 on the clamp rod. A compression coil spring 62 surrounds the clamp rod 48 and presses on the inner side of the drive plate 12 and on the lock housing 60 to urge the lock housing, and hence the clamp rod, to the right in FIG. 2. This causes the cross member 54 of the clamp bar to press against the wear ring 34 of the cutter to seat the cutter on the supporting surface 22 of the drive plate when the cutter is rotated to a position in which the keys 40 and 42 align with slots 36 and 38.

The wear ring 34 has a pair of diametrically opposite notches 70 cut from the inner periphery thereof. These notches will clear the ends of the cross member 54 of the clamp bar 44 when the cutter is rotated to a position in which the ends of the cross member register with the notches.

The clamp bar 44 is held in the position shown relative to the clamp rod 48 by a spring-pressed ball 72 in the locating unit 74 provided in the clamp rod 48 which engages a recess 76 in the end of the stem 52 of the clamp bar. This arrangement allows the clamp bar to properly orient itself with respect to the cutter when clamping the cutter.

The clamping system includes two or more lock fingers 78 carried by the lock housing 60. The lock fingers are mounted in symmetrically arranged slots 80 in the lock housing. Each lock finger turns on a pivot pin 82 and has a radially outwardly extending hook portion 84 adapted to extend into an annular groove 86 in the spindle bore. The hook portions of the fingers are far enough from the pivot pins that the fingers are urged radially outwardly by centrifugal force during rotation of the spindle to cause the hook portions to engage in the groove 86. Complementing the effect of centrifugal force, the lock fingers 78 are urged to positions in which their hook portions engage in the spindle groove by a circular lock spring 88 which engages in recessed portions of the lock fingers on the side of the pivot pins 82 opposite the hook portions thereof. With centrifugal force maintaining the hook portions engaged in the groove, the cutter will be held firmly seated on the drive plate even in the event of a failure of the springs 62 and 88.

Figure 2:
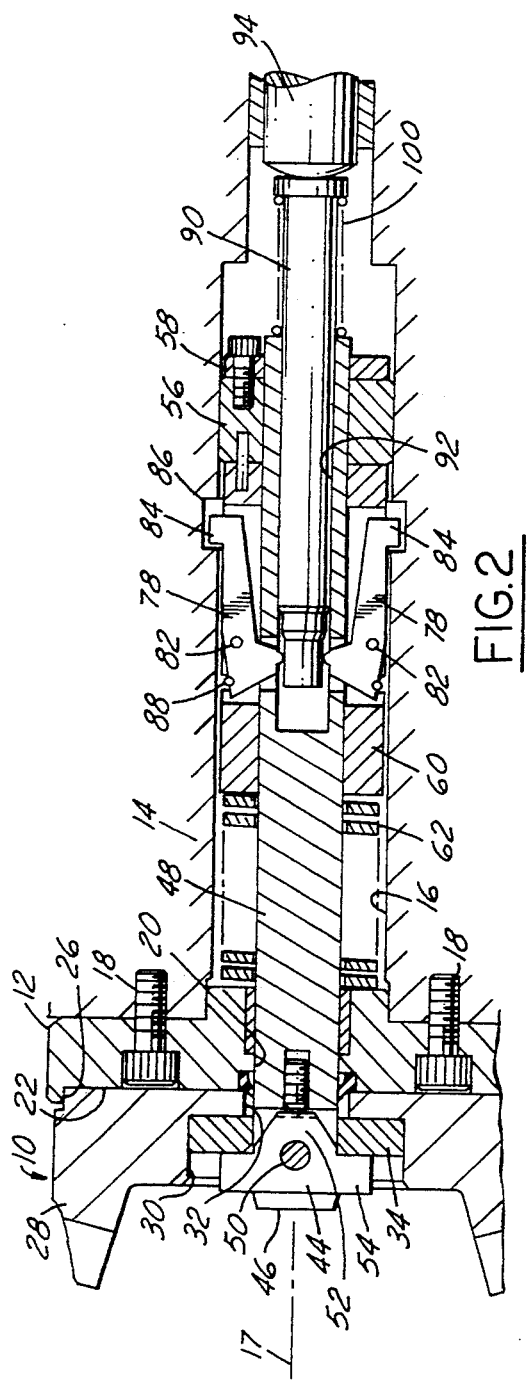
FIG. 2 is a sectional view taken on the line 2—2 in FIG. 1.

FIGS. 1 and 2 show the cutter clamped to the face of the drive plate with drive keys 40 and 42 engaged in slots 36 and 38 and with the cross member 54 of the clamp bar 44 engaging alignment pins 89 on the wear ring 34 in the cutter. These pins could extend through the wear ring and into the cutter body, if desired. This is the position of the parts when the cutter is employed to remove metal from a workpiece. The cutter 10 is held firmly clamped to the drive plate 12 by the action of compression spring 62.

Figure 3:
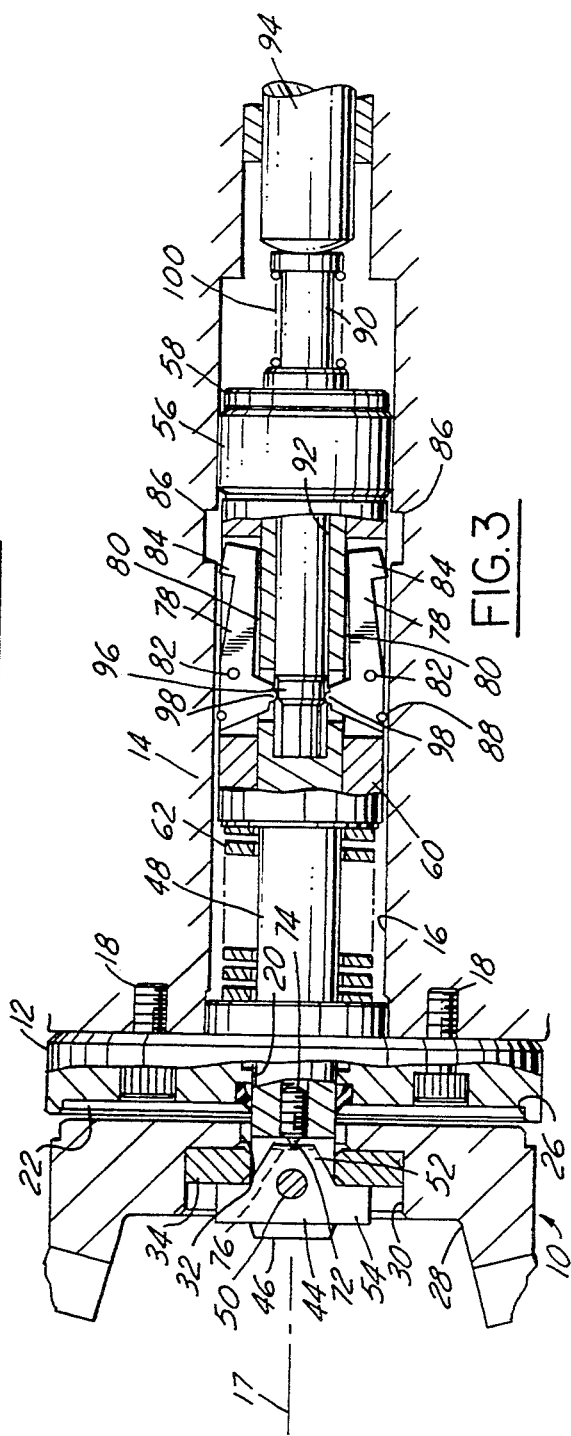
FIG. 3 is a sectional view similar to FIG. 2 but showing the quick-change system in the unclamped position.

If it should be desired to remove the cutter from the drive plate for any reason, as for example for sharpening or replacement, the clamp rod 48 is moved to the left in FIG. 2 to the FIG. 3 position in which the cutter is displaced sufficiently to remove the drive keys from engagement in the grooves of the cutter. This movement of the clamp rod is accomplished by a lock release rod 90 which slides within a bore 92 in the inner end of the clamp rod. The lock release rod is moved to the left by a push rod 94 which is driven by a conventional power device (not shown). The lock release rod 90 moves the clamp rod 48 to the left when the end of the lock release rod engages the bottom of the bore 92 in the clamp rod. This end of the lock release rod has a cam portion 96 which, during its leftward movement to release the cutter, engages the nose 98 of each lock finger 78 to pivot it sufficiently to withdraw the hook portions 84 from the groove 86 in the spindle, so that the clamp rod 48 and clamp bar may be displaced to the left far enough to unclamp the cutter. The withdrawal of the hook portions 84 from spindle groove 86 by the action of cam portion 96 takes place before the end of the lock release rod 90 engages the bottom of the bore 92 in the clamp rod 48.

When the power device is deactivated, the lock release rod is retracted by a compression coil spring 100. The power device is preferably activated and deactivated by "clamp" and "unclamp" buttons accessible to the operator when changing the cutter.

Removing the Cutter

When it becomes necessary or desirable to change cutters, the operator stops the spindle and pushes the unclamp button which operates the power device (not shown) to cause push rod 94 to advance against the lock release rod 90 and push it until the nose 98 of the lock fingers 78 ride up on the cam portion 96 of the lock release rod causing the lock fingers to pivot, stretching the lock spring 88 and disengaging the hook portions 84 of the lock fingers from the spindle groove 86. The lock release rod 90 continues forward compressing the spring 62 and moving the clamp rod 48 and clamp bar 44 as well as the cutter 10 forwardly until the cutter 10 is completely disengaged from the drive keys 40 and 42. The cutter may now be rotated 90°, aligning the ends of the cross member 54 of the clamp bar 44 with the notches 70 in the wear ring 34 of the cutter so that the cutter may be removed from the drive plate 12.

Installing the Cutter

With the quick-tool change system still in the unclamped position, the operator will load a new cutter body with the notches 70 in the cutter body in line with the cross member 54 of the clamp bar 44, and will push it on until the rear face of the cutter body contacts the tops of the drive keys 40 and 42. The operator will then reverse rotate the cutter 90° until the alignment pins 89 contact the cross member of the clamp bar and prevent further rotation. The slots 36 and 38 in the back of the cutter now line up with the drive keys 40 and 42. The operator pushes the clamp button which deactivates the power device (not shown), causing the push rod 94 to retract and allowing the spring 62 to force the clamp rod 48 to the right in FIG. 3 and the clamp bar 44 to contact the wear ring 34 and force the cutter onto the drive keys 40 and 42 against the seat 22 of the drive plate 12.

The lock release rod 90 continues retracting under the influence of spring 100 until the lock fingers 78 are pushed out by the lock spring 88 causing the hook portions 84 of the lock fingers to engage in the spindle groove 86. The centrifugal force created when the spindle is rotating will hold the lock fingers engaged in the spindle groove even if the lock spring 88 or the clamp spring 62 are broken. This prevents the cutter from accidentally becoming disengaged from the drive plate during rotation.

The removal and replacement of the cutter can be accomplished with one hand in a matter of only a few seconds.

What is claimed is:

1. A cutter quick change system comprising a spindle having an axial bore, a rotary drive plate on said spindle, a cutter, said drive plate having a seat for supporting said cutter, releasable drive means for causing said cutter to rotate with said drive plate when clamped on said seat, and releasable clamping means for clamping said cutter on said seat, said drive plate and cutter having aligned center openings, said clamping means comprising a clamp rod disposed in said bore and extending through said center openings in said drive plate and cutter, a clamp bar carried by said clamp rod releasably engaging said cutter, and means acting on said clamp rod for holding said clamp bar engaged with said cutter, said clamp bar and clamp rod rotating with said drive plate and cutter when said clamp bar engages said cutter as aforesaid, said holding means comprising a spring operably engaged with said clamp rod to impose yielding pressure on said clamp bar, said holding means also comprising a lock finger pivoted to said clamp rod and having a locking projection, said spindle bore having a recess opposite said projection, said finger being activated by centrifugal force incident to rotation of said spindle to cause said projection to engage in said recess, said projection having a positive locking engagement in said recess during rotation of said spindle to hold the cutter firmly on said seat even in the event of failure of said spring.

2. A cutter quick change system as defined in claim 1, and further including an axially movable release rod for moving said clamp rod against the action of said spring away from a position holding said clamp bar engaged with said cutter, said release rod having cam means for swinging said lock finger so as to withdraw said projection from said recess when said release rod moves said clamp rod as aforesaid.

3. A cutter quick change system comprising an axially rotatable spindle, a drive plate concentrically mounted on said spindle, a cutter, said drive plate having a seat for supporting said cutter, releasable drive means for causing said cutter to rotate with said drive plate when clamped on said seat, releasable clamping means for clamping said cutter on said seat, said spindle having an axial bore and said drive plate and cutter having center openings aligned with said bore, said clamping means comprising a clamp rod disposed axially in said bore and extending through said center openings in said drive plate and cutter, said clamp rod having a clamp bar releasably engaging said cutter and holding means resisting axial movement of said clamp rod away from a position holding said clamp bar engaged with said cutter, said holding means including a spring operably engaged with said clamp rod to impose yieldable clamping pressure on said clamp bar, and an axially movable release rod for moving said clamp rod against the action of said spring to relieve said clamp bar from the pressure of said spring and thereby release said cutter, said clamp bar and clamp rod rotating with said spindle, drive plate and cutter when said clamp bar engages said cutter as aforesaid, said holding means also including a lock housing mounted on said clamp rod within said spindle bore, at least one lock finger pivoted to said lock housing said finger having a locking projection, said spindle bore having a circumferential groove opposite said locking projection, said finger being pivoted by centrifugal force in response to rotation of said spindle causing said locking projection to enter said groove and prevent movement of said clamp rod in a direction to cause release of said cutter by said clamp bar.

4. A cutter quick change system as defined in claim 3 wherein said release rod has cam means for swinging said lock finger so as to withdraw said locking projection from said groove when said release rod moves axially to move said clamp rod against the action of said spring.

5. A cutter quick change system as defined in claim 4, wherein said cutter when released by said clamp bar, is rotatable relative to said clamp bar from a first position in which said cutter is oriented relative to said clamp bar for being clamped to the seat of said drive plate to a second position in which said cutter clears said clamp bar and may be removed from or assembled with said drive plate.

6. A cutter quick change system as defined in claim 5 wherein said drive means comprises a key and a slot one of which is carried by said cutter and the other by said drive plate, said key entering said slot when said cutter is in said first position.

7. A cutter quick change system comprising a spindle, a drive plate mounted on said spindle, a cutter, said drive plate having a seat for supporting said cutter, clamping means for releasably clamping said cutter on said seat, and holding means including a spring pressing said clamping means in clamping engagement with said cutter, said holding means also including at least one lock finger, a recess in said spindle, said lock finger having a projection and being supported on said clamping means for movement from a first position in which said projection is engaged in said recess to a second position in which said projection is withdrawn from said recess, and means for releasably retaining said finger in said first position, said projection having a positive locking engagement with said recess to hold the cutter on said seat even in the event of failure of said spring.

8. A cutter quick change system as defined in claim 7, wherein means are provided for pivoting said lock finger for said movement from said first to said second position, and said means for retaining said finger in said first position comprises a spring.

9. A cutter quick change system comprising an axially rotatable spindle, a drive plate mounted on said spindle, a cutter, said drive plate having a seat for supporting said cutter, said spindle having an axial bore, releasable clamping means for clamping said cutter on said seat, said clamping means comprising a clamp rod extending through said bore and having a clamp bar releasably engaging said cutter, holding means resisting axial movement of said clamp rod away from a position holding said clamp bar engaged with said cutter including a spring operably engaged with said clamp rod to impose yielding clamping pressure on said clamp bar, a release rod for moving said clamp rod against the action of said spring away from a position holding said clamp bar engaged with said cutter, said holding means also including a lock finger provided with a locking projection, means pivoting said lock finger to said clamp rod, said spindle bore having a recess opposite said locking projection, and spring means urging said lock finger in a direction to cause said projection to engage in said recess and prevent movement on said clamp rod in a direction to cause release of said cutter by said clamp bar, said projection having a positive, locking engagement with said recess to hold the cutter firmly on said seat even in the event of failure of said spring.

10. A cutter quick change system comprising an axially rotatable spindle, a drive plate mounted on said spindle, a cutter, said drive plate having a seat for supporting said cutter, said spindle having an axial bore, releasable clamping means for clamping said cutter on said seat, said clamping means comprising a clamp rod extending through said bore and having a clamp bar releasably engaging said cutter, holding means resisting axial movement of said clamp rod away from a position holding said clamp bar engaged with said cutter including a spring operably engaged with said clamp rod to impose yielding clamping pressure on said clamp bar, an axially movable release rod for moving said clamp rod against the action of said spring away from a position holding said clamp bar engaged with said cutter, said holding means also including a lock finger provided with a locking projection, means pivoting said lock finger to said clamp rod, said spindle bore having a recess opposite said locking projection, and spring means urging said lock finger in a direction to cause said projection to engage in said recess and prevent movement on said clamp rod in a direction to cause release of said cutter by said clamp bar, said release rod having cam means for swinging said lock finger so as to withdraw said locking projection from said recess when said release rod moves axially to move said clamp rod against the action of said spring.

11. A cutter quick change system comprising a spindle, a drive plate mounted on said spindle, a cutter, said drive plate having a seat for supporting said cutter, clamping means for releasably clamping said cutter on said seat, and holding means including a spring pressing said clamping means in clamping engagement with said cutter, said holding means also including at least one lock finger, a recess in said spindle, said lock finger having a projection and being supported on said clamping means for movement from a first position in which said projection is engaged in said recess to a second position in which said projection is withdrawn from said recess, said finger being activated by centrifugal force incident to rotation of said spindle to cause said projection to engage in said recess, said projection having a positive locking engagement in said recess during rotation of said spindle to hold the cutter firmly on said seat even in the event of failure of said spring.

* * * * *